Figure 1:
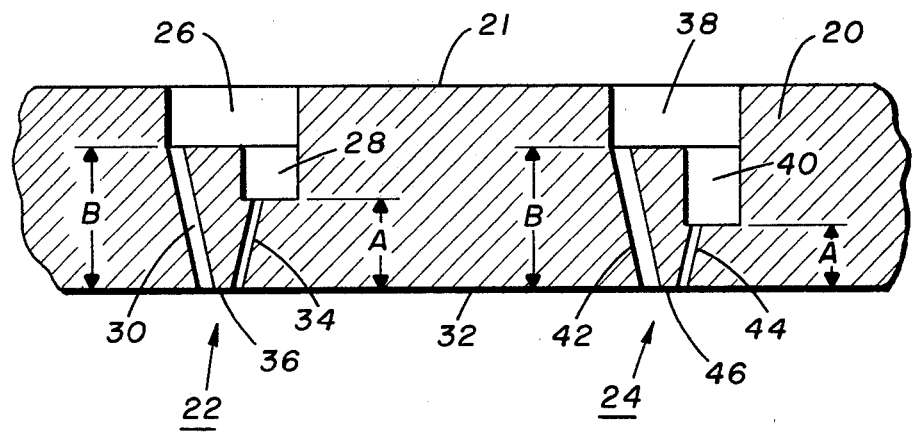

United States Patent [19]

Dees

[11] 4,376,743
[45] Mar. 15, 1983

[54] MELT SPINNING PROCESS

[75] Inventor: John R. Dees, Pensacola, Fla.

[73] Assignee: Fiber Industries, Inc., Charlotte, N.C.

[21] Appl. No.: 273,135

[22] Filed: Jun. 12, 1981

[51] Int. Cl.³ .............................................. D02G 1/20
[52] U.S. Cl. .................................. 264/103; 264/177 F; 264/171; 425/461; 425/465
[58] Field of Search .................... 264/177 F, 168, 171; 425/461, 465

[56] References Cited

U.S. PATENT DOCUMENTS

| 2,804,645 | 9/1957 | Wilfong | 264/167 F |
| 3,109,195 | 11/1963 | Combs et al. | 264/177 F |
| 3,219,739 | 11/1965 | Breen et al. | 264/177 F |
| 3,323,168 | 6/1967 | Dyanen et al. | 264/177 F |
| 3,387,327 | 6/1968 | Privott et al. | 264/168 |
| 3,405,424 | 10/1968 | Imobersteg et al. | 264/177 F |
| 3,635,641 | 1/1972 | Turner | 264/177 F |
| 3,834,251 | 9/1974 | Hawkins | 264/177 F |
| 3,920,784 | 11/1975 | Nakagawa et al. | 264/177 F |
| 4,176,211 | 11/1979 | Jackson | 264/177 F |

FOREIGN PATENT DOCUMENTS

| 2835706 | 2/1979 | Fed. Rep. of Germany | 264/177 F |
| 669246 | 10/1964 | Italy | 264/177 F |
| 30-6415 | 9/1955 | Japan | 264/177 F |
| 40-9535 | 5/1965 | Japan | 264/177 F |
| 42-22339 | 9/1968 | Japan | 264/177 F |
| 44-7379 | 4/1969 | Japan | 264/177 F |
| 44-16804 | 7/1969 | Japan | 264/177 F |
| 1009625 | 11/1965 | United Kingdom | 264/177 F |
| 1112938 | 5/1968 | United Kingdom | 264/177 F |
| 1160263 | 8/1969 | United Kingdom | 264/177 F |
| 1219110 | 1/1971 | United Kingdom | 264/177 F |
| 1455205 | 11/1976 | United Kingdom | 264/177 F |

Primary Examiner—Jay H. Woo

[57] ABSTRACT

A spinneret has a number of combined orifices having different nominal dimensions. Yarns spun from such spinnerets have less doff-to-doff average standard deviation of yarn bulk.

6 Claims, 2 Drawing Figures

MELT SPINNING PROCESS

The invention relates to the art of spinning variable denier filaments.

It is known to spin variable denier filaments from spinnerets wherein two or more individual capillaries are arranged to cooperate as a combined orifice to spin each filament. An oscillation is produced just below the spinneret face, as described in Japanese patent publications Nos. 43-22339 and 44-16804, and in British Pat. specification No. 2,003,423. Yarns made with the spinnerets of these publications are frequently undesirably variable in their properties from doff-to-doff, that is, in properties of yarn on successive bobbins made from the same spinneret.

According to the present invention, these doff-to-doff property variations are reduced by providing the spinneret with a plurality of combined orifices having different nominal dimensions, rather than with all combined orifices having identical nominal dimensions. By combined orifices having "different nominal dimensions" is meant that at least one of the following conditions are met when comparing corresponding parts of different combined orifices:

a. corresponding capillary lengths differ by at least 0.0007 inch (0.018 mm.);
b. corresponding capillary transverse dimensions (e.g, diameter in the case of a round capillary) differ by at least 0.0002 inch (0.005 mm.);
c. the included angles between the corresponding capillaries differ by at least one degree; or
d. the land widths between corresponding capillaries differ by at least 0.0006 inch (0.015 mm.).

DESCRIPTION OF THE INVENTION

According to a first major aspect of the invention, there is provided a spinneret comprising a plurality of combined orifices having different nominal dimensions. According to another aspect of the invention, the spinneret comprises at least five combined orifices having nominal dimensions selected such that each of the five combined orifices has different nominal dimensions than each of the others of the five combined orifices.

Figure 2:
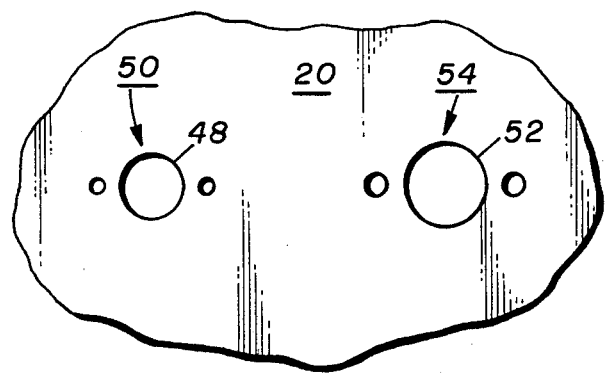

According to another major aspect of the invention, there is provided a spinning process, comprising extruding molten polymer streams of fiber-forming molecular weight through a spinneret having a plurality of combined orifices having different nominal dimensions, solidifying said molten streams into filaments having variable deniers along their lengths. According to another aspect of the invention, the spinneret comprises at least five combined orifices having nominal dimensions selected such that each of the combined orifices has different nominal dimensions than each of the others of the five combined orifices. According to another aspect of the invention, the polymer is polyethylene terephthalate Other aspects will in part appear hereinafter and will in part be obvious from the following detailed description taken in connection with the accompanying drawing, wherein:

FIG. 1 is a vertical sectional view of a portion of an exemplary spinneret according to the invention; and FIG. 2 is a bottom plan view of a portion of another spinneret according to the invention.

FIG. 1 shows a spinneret plate 20 comprising two combined orifices 22 and 24. Combined orifice 22 includes a large counterbore 26 formed in the upper surface 21 of spinneret plate 20. Small counterbore 28 is formed in the bottom of and at one side of large counterbore 26. A large capillary 30 extends from the bottom of large counterbore 26 at the side opposite small counterbore 28, and connects the bottom of large counterbore 26 with the lower surface 32 of plate 20. Small capillary 34 connects the bottom of counterbore 28 with surface 32. Capillaries 30 and 34 are equally inclined from the vertical, and thus provide an included angle. Land 36 separates capillaries 30 and 34 as they emerge at surface 32. Similarly, combined orifice 24 includes the respective corresponding parts of large counterbore 38, small counterbore 40, large capillary 42, small capillary 44, and land 46.

According to the invention, the spinneret comprises a plurality of combined orifices having different nominal dimensions. While any of the nominal dimensions may be different within the scope of the invention, a preferred embodiment of the FIG. 1 type may be made by varying the capillary lengths. As a specific example containing 68 combined orifices, the large counterbores have diameters of 0.113 inch (2.87 mm.), the small counterbores have diameters of 0.052 inch (1.32mm.), the large capillaries have diameters of 0.0164 inch (0.42 mm.), and the small capillaries have diameters of 0.0093 inch (0.24 mm.). The land between the capillaries of each combined orifice is 0.004 inch (0.1 mm.), and each capillary is inclined five degrees from the vertical, and thus the capillaries of each combined form an included angle of ten degrees. Plate 20 has a thickness of 0.865 inch (22 mm.). The lengths of the capillaries are selected by selection of the distances A between the bottoms of the small counterbores and surface 32, as follows:

TABLE I

| Number of Combined Orifices | Distance A, Inches | Distance B, Inches |
|---|---|---|
| 7 | 0.034 | 0.148 |
| 11 | 0.033 | 0.146 |
| 13 | 0.033 | 0.148 |
| 6 | 0.032 | 0.146 |
| 13 | 0.032 | 0.148 |
| 11 | 0.031 | 0.146 |
| 7 | 0.031 | 0.148 |

EXAMPLE I

Polyethylene terephthalate polymer of normal molecular weight for apparel yarn is extruded at a temperature of 293° C. through the above disclosed preferred spinneret. The resulting 68 molten streams are conventionally quenched into 68 filaments with a total denier of 165 by transversely directed air, a conventional finish is applied, and several bobbins of the resulting yarn are wound at a spinning speed of 5000 yards per minute. The experiment is repeated with five other spinnerets of this specific design. The average doff-to-doff standard deviation in yarn bulk is 1.55%.

EXAMPLE II

Example I is repeated, except the above preferred spinneret is replaced with a number of control spinnerets having 68 nominally identical combined orifices wherein the small capillaries have diameters of 0.0092 inch (0.234 mm.), the large capillaries have diameters of 0.0164 inch (0.417 mm.), dimension A is 0.032 inch (0.813 mm.), and dimension B is 0.146 inch (3.708 mm.). All other nominal dimensions of the control spinneret are the same as those of the preferred spinneret design in Example I above. The average doff-to-doff standard deviation in yarn bulk is 4.22% for yarn made using the control spinnerets of this example.

When the individual capillaries are substantially parallel, as in the spinneret designs disclosed in the two Japanese patent publications noted above, it is normally easier to provide for different capillary transverse dimensions than for different capillary lengths. One such variation is illustrated in FIG. 2, wherein the large central capillary 48 in combined orifice 50 has a smaller diameter than the large central capillary 52 in combined orifice 54.

"Bulk" as used herein is determined as follows. The yarn is wound into a skein with a 1.25 meter perimeter using a Suter denier reel, the number of revolutions equalling 8000 divided by twice the yarn denier and the tension during skeining being 0.035 grams per yarn denier. The skein is then carefully hung on a ½ inch (1.27 centimeter) diameter rod, and a 0.6 gram weight in the form of a metal hook is attached to the bottom of the skein. A 1000 gram weight is suspended from the hook and, after 30 seconds, the skein length from top of rod to top of hook is measured to the nearest millimeter, this measurement being designated hereinafter as $L_o$. The 1000 gram weight is then replaced with a 20 gram weight, and the skein with weight attached is placed in a 120° C. oven sufficiently large that the skein is suspended from the rod while supporting the weight. After 5 minutes in the oven, the skein is removed and hung, still suspended from the rod and with the 20 gram weight still attached, in an atmosphere of 23° C. and 72% relative humidity. After one minute, the skein length from the top of the rod to the top of the hook is measured to the nearest millimeter, this quantity being identified as $L_f$. The bulk in percent then equals $(L_o-L_f)(100)/L_o$.

What is claimed is:

1. In a spinneret comprising a plurality of combined orifices having corresponding parts in corresponding arrangement, said parts and arrangement including two or more individual capillaries disposed in angular relationship, separated by a land and arranged to spin a variable denier filament, the improvement comprising, said combined orifices having different nominal dimensions such that either, a. corresponding capillary lengths differ by at least 0.0007 inch;
   b. corresponding capillary transverse dimensions differ by at least 0.0002 inch;
   c. the included angles between the corresponding capillaries differ by at least 1 degree; or
   d. the land widths between corresponding capillaries differ by at least 0.0006 inch, said different nominal dimensions of said combined orifices being selected to reduce doff to doff property variations of yarns spun from said spinneret.

2. The spinneret of claim 1, wherein said spinneret comprises at least five combined orifices having said nominal dimensions selected such that each of said five combined orifices has different nominal dimensions than each of the others of said five combined orifices.

3. In a spinning process, comprising:

a. Extruding molten polymer streams of fiber-forming molecular weight through a spinneret having a plurality of combined orifices having corresponding parts in corresponding arrangement, said parts and arrangement including two or more individual capillaries disposed in angular relationship, separated by a land and arranged to spin a variable denier filament: and
   b. solidifying said molten streams into filaments having variable deniers along their lengths, the improvement comprising, said combined orifices having different nominal dimensions such that either corresponding capillary lengths differ by at least 0.0007 inch; corresponding transverse dimensions differ by at least 0.0002 inch;
   the included angles between corresponding capillaries differ by at least 1 degree; or the land widths between corresponding capillaries differ by at least 0.0006 inch, said different nominal dimensions of said combined orifices being selected to reduce doff to doff property variations of yarns spun from said spinneret.

4. The process defined in claim 3, wherein said spinneret comprises at least five combined orifices having said nominal dimensions selected such that each of said combined orifices has different nominal dimensions than each of the others of said five combined orifices.

5. The process defined in claim 3, wherein said polymer is polyethylene terephthalate.

6. The process defined in claim 4, wherein said polymer is polyethylene terephthalate.

* * * * *